United States Patent [19]

Hess et al.

[11] 3,917,749

[45] Nov. 4, 1975

[54] RESINOUS BUTADIENE/STYRENE REINFORCING COPOLYMERS

[75] Inventors: LLoyd D. Hess, Cuyahoga Falls; William C. Mast, Stow, both of Ohio

[73] Assignee: The Goodyear Tire & Rubber Company, Akron, Ohio

[22] Filed: Dec. 14, 1973

[21] Appl. No.: 425,008

[52] U.S. Cl............. 260/880 R; 260/83.7; 260/892
[51] Int. Cl.² ................................. C08L 9/08
[58] Field of Search.. 260/880 R, 892, 83.7, 29.6 D, 260/29.6 DP

[56] References Cited
UNITED STATES PATENTS

| | | | |
|---|---|---|---|
| 2,611,719 | 9/1952 | Borders | 260/892 |
| 2,661,339 | 12/1953 | Sparks | 260/892 |
| 2,726,221 | 12/1955 | Semegen | 260/892 |
| 2,880,185 | 3/1959 | Lee | 260/892 |
| 2,994,677 | 8/1961 | Bohnert | 260/892 |

Primary Examiner—Paul R. Michl
Attorney, Agent, or Firm—F. W. Brunner; J. P. Ward

[57] ABSTRACT

There is disclosed improved resinous butadiene/styrene reinforcing copolymers prepared by a two step emulsion polymerization process comprising the steps of (A) polymerizing, under aqueous emulsion polymerization conditions, a first monomeric mixture of butadiene and styrene in the presence of water, polymerization initiator, molecular weight modifier and emulsifier to obtain a first butadiene/styrene copolymer latex and (B) adding to and polymerizing in said first copolymer latex a second monomer mixture of butadiene and styrene in the presence of water, polymerization initiator, molecular weight modifier and emulsifier wherein the monomeric mixture polymerized in step (A) ranges from 5 to 32 percent higher in styrene content than the monomeric mixture added and polymerized in step (B).

3 Claims, No Drawings

RESINOUS BUTADIENE/STYRENE REINFORCING COPOLYMERS

This invention relates to improved reinforcing copolymer resins for use in blends with synthetic rubbers. Particularly this invention relates to improved reinforcing copolymer resins of butadiene and styrene wherein the styrene component is present in a predominant amount. More particularly this invention relates to a two step aqueous emulsion polymerization process for preparing said improved reinforcing copolymer resins.

It is well known that synthetic rubbers such as polybutadiene can be blended with a resinous copolymer such as butadiene/styrene copolymer wherein the styrene is present in a predominant amount (U.S. Pat. No. 2,638,462). Such compositions possess many desirable characteristics and in addition exhibit characteristics not exhibited by the component parts, which characteristics have made such blends highly accepted in the shoe sole and electrical insulation industries. However, notwithstanding this commercial success there do exist certain drawbacks in the production and processing of these blended compositions. Specifically these drawbacks include high heat build-up during the blending operation, requiring that the blend be cooled before being compounded in order to avoid premature curing, and the inability to achieve a smooth appearing and smooth processing finished stock. Generally a sufficient quantity of a molecular weight modifier can be added to provide better processing compositions, but because of the amount of modifier required said compositions possess poor physical properties (i.e., poor flex life, modulus, hardness, etc.).

The resinous copolymers heretofore used in the blended compositions discussed above have been prepared in a one step process comprising copolymerizing styrene and butadiene under aqueous emulsion polymerization conditions. By "aqueous emulsion polymerization conditions" is meant that styrene and butadiene are copolymerized in a water phase in the presence of a polymerization initiator, emulsifier and modifier which initiate and aid the polymerization and regulate the molecular weight of the final product respectively. The copolymerization is carried out at a temperature necessary to effect reaction of the styrene and butadiene and is continued until the desired conversion is attained. The resulting latex is then coagulated and the coagulum washed and dried. An example of such a preparation is set forth in U.S. Pat. No. 2,615,206. Resinous copolymers prepared in this one step manner exhibit high Mooney viscosities and high resistances to flow properties which properties contribute directly to the processing drawbacks discussed above.

It has now been found that resinous butadiene/styrene copolymers exhibiting low Mooney viscosities and low resistances to flow properties, which copolymers overcome the processing drawbacks associated with the prior art resins, can be prepared under aqueous emulsion polymerization conditions by employing a two step process rather than the one step process presently employed. Accordingly, the present invention consists of a two step polymerization process and butadiene/styrene copolymers prepared thereby wherein said polymerization process comprises the steps of (A) polymerizing, under aqueous emulsion polymerization conditions, a first monomeric mixture consisting of from 5 to 15 parts by weight of butadiene monomer, based on the total weight of combined monomers polymerized in step (A) and from 95 to 85 parts by weight of styrene monomer, based on the total weight of combined monomers polymerized in step (A) in the presence of water, polymerization initiator, emulsifier and molecular weight modifier to obtain a first butadiene/styrene copolymer latex and (B) adding to and polymerizing in said first butadiene/styrene resinous copolymer latex a second monomeric mixture consisting of from 20 to 35 parts by weight of butadiene monomer, based on the total weight of the combined monomers polymerized in step (B), and from 80 to 65 parts by weight of styrene monomer, based on the total weight of the combined monomers polymerized in step (B), in the presence of water, polymerization initiator, emulsifier and molecular weight modifier to obtain a final butadiene/styrene resinous copolymer latex. The final copolymer latex is then coagulated and dried to give solid butadiene/styrene resinous copolymer resins. The improved copolymer reinforcing resins prepared in accordance with this invention possess the desired low Mooney viscosities and low resistance to flow found to be necessary to overcome the drawbacks associated with previously employed butadiene/styrene resinous copolymer resins and in addition possess the necessary physical properties required in electrical insulation and shoe sole applications.

In the above described two step aqueous emulsion polymerization process the ratio of the total weight of the combined monomers employed in step (A) to the total weight of the combined monomers employed in step (B) can range from 75/25 to 25/75. A further characteristic of the above described process is that in order to obtain improved butadiene/styrene resinous copolymers having low Mooney viscosities and low resistances to flow it is necessary that the monomeric mixture polymerized in step (A) be from 5 to 32 percent higher in styrene content than the monomeric mixture added and polymerized in step (B).

As noted hereinabove, the process of the present invention is a two step aqueous emulsion polymerization process. And, as further noted hereinabove, this means that in each step of the process the butadiene and styrene comonomers are copolymerized in the presence of water, a polymerization initiator, an emulsifier and a molecular weight modifier (or chain transfer agent). In carrying out the process of this invention various well known aqueous emulsion polymerization initiators can be employed. Representative examples of suitable polymerization initiators include sodium, potassium and ammonium persulfates, benzoyl peroxide, hydrogen peroxide, perborates and percarbonates. In each step of the process the initiators are employed in amounts ranging from 0.01 to 5.0 parts per 100 parts of the combined monomers, and preferably are employed in amounts ranging from 0.1 to 1.0 part per 100 parts of the combined monomers.

Typical emulsifiers are those which may be generally referred to as the fatty acid soaps such as, for example, sodium stearate, the rosin acid soaps such as, for example, sodium rosinate, the alkali metal salts of alkyl sulfuric acid esters such as, for example, sodium lauryl sulfate, the alkali metal salts of alkylaryl sulfonates, such as, for example, sodium dodecyl benzene sulfonate and tallow soap. In each step of the process the emulsifier can be present in an amount ranging from 1.5 to 10.0 parts per hundred parts of combined monomers. A preferred range of emulsifier is betwen 3.0 to 5.0 parts per hundred parts of combined monomers.

In addition, a modifier (or chain transfer agent) is added to the reaction mixture which acts to regulate the molecular weight. Typical of the molecular weight modifiers useful in the present invention include those belonging to the class known as mercaptans which contain at least six carbon atoms. Representative examples of useful mercaptans include isohexyl mercaptans, octadecyl mercaptan, dodecyl mercaptan, tertiary dodecyl mercaptan and the like. Other classes of useful modifiers include dialkyl polysulfides such as di(sec-butyl) disulfide, di(2-methylbutyl) disulfide, di(2-pentylbutyl) disulfide and di(2-ethylhexyl) disulfide; nitro diaryl polysulfides such as di-ortho-nitrophenyl disulfide, di-para-nitro-phenyl disulfide and dimeta-nitrophenyl disulfide; dialkyl xanthogen disulfides such as diisopropylxanthogen disulfide and di(benzoic acid ester) tetrasulfides, tolyl disulfide and tolyl trisulfide. In each step of the process the modifiers can be used in an amount ranging from 0.01 to 2.0 parts per 100 parts of the combined monomers. Generally it is preferred to use between 0.05 to 0.15 part of modifier per 100 parts of the combined monomers.

Generally in preparing the butadiene/styrene resinous copolymers of this invention the water, initiator and emulsifier are first added to a suitable reaction chamber. The chamber is then flushed with nitrogen and evacuated and the first charge of styrene monomer containing a molecular weight modifier, and the first charge of butadiene monomer are added to the reactor. Heat is applied to this reaction mixture and the polymerization allowed to proceed. When the polymerization is complete, as determined by the solids content of the reaction mixture, a second water charge, containing further initiator and emulsifier is then added under nitrogen pressure to the reaction chamber followed by the addition of a second charge of styrene monomer containing further molecular weight modifier and a second charge of butadiene monomer. The temperature of the resulting reaction mixture is then increased and the polymerization continued until the desired solids content is reached. At this time the latex is cooled, coagulated, washed with water and dried in accordance with known techniques.

Generally both steps in the process of this invention are carried out at a temperature between 20° and 70° C. and each polymereization step will take from 3 to 10 hours to complete, depending upon the percent conversion desired, ratio of monomers charged and initiator employed.

As noted hereinabove, the butadiene/styrene resinous copolymers produced by the present two step aqueous emulsion polymerization process exhibit low Mooney viscosities and low resistances to flow. In general the resinous copolymers of this invention will possess Mooney viscosities, as determined by ASTM Test No. D-1646, ranging from about 50 to about 70 and Olson Flow (ASTM Test No. D-569) times at 120° C. ranging 0.5 to 8.0 seconds. The resinous copolymers are further characterized by softening points ranging from 40° to 60° C. These characteristics are all indicative of a copolymer which will exhibit low heat build-up during blending as well as a smooth appearing and smooth processing finished stock.

The final latex, i.e., the latex removed from the reactor at the end of step (B), can be coagulated employing a variety of well known coagulants. Representative examples of such coagulants include alcohols such as methyl alcohol, isopropyl alcohol and the like; commercial alum (aluminum sulfate); mixtures of an acid and a salt such as a mixture of sulfuric acid and sodium chloride, mixtures of an alcohol and a salt such as a mixture of methyl alcohol and sodium chloride, salts such as barium chloride, magnesium chloride and calcium chloride either alone or in combination with an acid. The final latex can also be coagulated by freezing.

The following examples serve to illustrate the invention.

EXAMPLE 1

A 10 pound sample of a butadiene/styrene resinous copolymer was prepared by the two step process of the present invention as follows: To a 5 gallon glass lined reactor was charged a mixture of 236.0 parts per 100 parts of monomers (phm) of distilled water, 0.12 phm of caustic soda, 0.5 phm of sodium sulfate, 5.0 phm of sodium soap chips and 0.33 phm of potassium persulfate ($K_2S_2O_8$). The reactor was sealed, thoroughly flushed with nitrogen and evacuated. Then 87.5 phm of styrene containing 0.05 phm of tertiary mercaptan were added to the reactor followed by the addition of 12.5 phm of butadiene. The temperature of this reaction mixture was then increased from ambient temperature (room temperature) to 50° C. and the polymerization allowed to proceed with agitation until a copolymer latex having a solids content between 27 to 28 percent by weight was attained.

While retaining the copolymer latex prepared in the first step above in the reactor at 50° C. there was then charged to the reactor 120 phm of water, containing 5.0 phm of sodium soap chips and 0.26 phm of $K_2S_2O_8$, 77.5 phm of styrene, containing 0.15 phm of tertiary mercaptan, a 22.5 phm of butadiene. After the addition of the butadiene was completed the temperature of this latex reaction mixture was increased to 57° C. and the copolymerization allowed to proceed until a copolymer latex having a solids content between 35 to 36 percent by weight was attained. At this point the latex was cooled, removed from the reactor, coagulated with aluminum sulfate, washed with distilled water and the resulting copolymer crumb dried in an oven at 49° C. for 16 hours. The weight ratio of the monomers charged in step 1 to the monomers charged in step 2 of the above process was 50/50 and the specific amounts of individual monomers employed in each step of the process were such that the butadiene/styrene ratio in the final polymer was 17.5/82.5. The copolymer properties are set forth in Table I below.

EXAMPLE 2

A second 10 pound sample of a butadiene/styrene resinous copolymer was prepared by the two step process of the present invention in the following manner. To a 5 gallon glass lined reactor were charged 228 phm of distilled water containing 0.08 phm of caustic soda, 0.35 phm of sodium sulfate, 5.0 phm of soap chips and 0.30 phm of $K_2S_2O_8$. The reactor was then sealed, flushed with nitrogen gas and evacuated. Then 87.5 phm of styrene containing 0.10 phm of tertiary mercaptan were added to the reactor followed by the addition of 12.5 phm of butadiene. The total weight of monomers charged was 7.5 pounds. The temperature of this mixture was increased from ambient temperature to 52° C. The polymerization was allowed to proceed with agitation until a copolymer latex having solids content between 30 to 31 percent by weight was attained.

When the above solids content was attained there was charged to the reactor an additional 80.0 phm of water, containing 5.0 parts of sodium soap chips and 0.32 phm of K₂S₂O₈, 67.6 phm of styrene, containing 0.1 phm tertiary mercaptan, and 32.4 phm of butadiene. The total weight of monomers charged was 2.5 pounds. After the addition of the butadiene monomer was complete the temperature of this latex/monomer reactor mixture was increased to 57° C. The polymerization was continued until the resulting copolymer latex had attained a solids content of between 35 to 36 percent by weight. The latex was then cooled and removed from the reactor and processed in the same manner as in Example 1. The weight ratio of the monomers charged in step 1 to those charged in step 2 of the process was 75/25 and the specific amounts of individual monomers employed in each step were such that the butadiene/styrene ratio in the final copolymer was 17.5/82.5. The copolymer properties are set forth in Table I below.

EXAMPLE 3

A third butadiene/styrene resinous copolymer was prepared in a manner similar to Example 1 above, the major exception being that the weight ratio of monomers charged in the first step of the polymerization process to those in the second step was 60/40. Again the specific amounts of individual monomers charged in the first and second steps were such that the final copolymer product possessed a butadiene/styrene ratio of 17.5/82.5. The formulation for the reaction mixture used in the first step of the process is as follows:

| Component | Parts |
| --- | --- |
| Water | 250.00 |
| Caustic Soda | 0.09 |
| Na₂SO₄ | 0.43 |
| Sodium Soap Chips | 5.00 |
| K₂S₂O₈ | 0.30 |
| Styrene | 87.50 |
| Tertiary Mercaptan | 0.12 |
| Butadiene | 12.50 |

The polymerization was carried out at 52° C. and allowed to continue until a copolymer latex containing a solids content of 29 to 30 percent was attained.

To this copolymer latex was then added, in the same manner as in Example 1, a reaction mixture of the following formulation.

| Component | Parts |
| --- | --- |
| Water | 100.00 |
| Sodium Soap Chips | 4.80 |
| K₂S₂O₈ | 0.28 |
| Styrene | 75.00 |
| Tertiary Mercaptan | 0.06 |
| Butadiene | 25.00 |

The temperature of the latex/monomer reaction mixture was then raised to 57° C. and the polymerization allowed to proceed until the solids content of the resulting copolymer latex was between 35 to 36 percent by weight. This latex product was then cooled and removed from the reactor and processed in the same manner as in Example 1. The copolymer properties are set forth in Table I below.

EXAMPLE 4

In order to demonstrate the preference that the monomer mixture charged in the first step of the process of this invention be higher in styrene content than that charged in the second step of the process this comparative example was performed. Example 1 was repeated employing the same reactants and conditions with the exception that 77.5 phm of styrene and 22.5 phm of butadiene were employed in the first stage of the process and 87.5 phm of styrene and 12.5 phm of butadiene employed in the second step of the process. Since the monomer mixture charged in the first step was lower in styrene content than that charged in the second step the resulting copolymer exhibited higher Mooney viscosity and longer flow times in comparison with the copolymers in Examples 1 – 3. These findings are summarized in Table I below.

Also, in order to illustrate the improved properties of the copolymers prepared in accordance with the two step process of this invention over those of a commercially available butadiene/styrene reinforcing resin, a comparison was made of the properties of the copolymers of Examples 1 – 3 with those of Pliolite S6F, a 17.5/82.5 butadiene/styrene copolymer available from The Goodyear Tire and Rubber Company and prepared by a one step process such as exemplified by U.S. Pat. No. 2,615,206. These findings are also set forth in Table I below.

TABLE I

| Exp. No. | 1 | 2 | 3 | 4 | Pliolite S6F |
| --- | --- | --- | --- | --- | --- |
| Softening Point, ° C. | 49.0 | 54.0 | 53.1 | 45.9 | 48 |
| Tensile, psi | 5794 | 3870 | 4550 | 4836 | 5585 |
| % Elongation | 4 | 10 | 5 | 3 | 3 |
| Shore D Hardness ⁽ᵃ⁾ | 77 | 78 | 79 | 80 | 79 |
| MS-4 at 212° F. ⁽ᵇ⁾ | 64.0 | 66.0 | 63.0 | 74.0 | 91.0 |
| Olson Flow, sec. to 1 inch at 1500 psi and 120° C. ⁽ᶜ⁾ | 4.0 | 5.0 | 6.5 | 12.0 | 21.0 |
| Banbury Test Appearance | Smooth | Smooth | Sl. Rough | Rough | Rough |
| Temperature ° F. | 335 | 335 | 335 | 345 | 350 |

⁽ᵃ⁾ ASTM Test No. D-2240
⁽ᵇ⁾ ASTM Test No. D-1646
⁽ᶜ⁾ ASTM Test No. D-569

It can be seen from the table above that when the copolymer resin is prepared in the manner disclosed in Example 4 that the Mooney viscosity and heat build-up in a Banbury are higher and the flow time longer than those prepared in the manner disclosed in Examples 1–3. However, all of these resinous copolymers exhibited far better Mooney viscosities, lower heat build-up and Olson flow times than the commercial product, Pliolite S6F. And, as noted above, it is these properties which are the most determinative of the ease of processibility of any particular butadiene/styrene reinforcing resin.

While certain representative embodiments and details have been shown for the purpose of illustrating the invention it will be apparent to those skilled in this art that various changes and modifications may be made therein without departing from the spirit or scope of the invention.

What we claim is:

1. Butadiene/styrene copolymer reinforcing resins prepared by a two step polymerization process comprising the steps of (A) polymerizing, under aqueous emulsion polymerization conditions, a first monomeric mixture consisting of from 5 to 15 parts by weight of butadiene monomer and from 95 to 85 parts by weight of styrene monomer, all parts based on the total weight of the combined monomers polymerized in step (A) to obtain a first butadiene/styrene copolymer latex and (B) adding to and polymerizing in said first butadiene/styrene copolymer latex a second monomeric mixture consisting of from 20 to 35 parts by weight of butadiene monomer and from 80 to 65 parts by weight of styrene monomer, all parts based on the total weight of the combined monomers polymerized in step (B) wherein the ratio of the total weight of the combined monomers in step (A) to the total weight of the combined monomers in step (B) ranges from 75/25 to 25/75 and wherein the monomeric mixture polymerized in step (A) ranges from 5 to 32 percent by weight higher in styrene content than the monomeric mixture added and polymerized in step (B).

2. Butadiene/styrene copolymer reinforcing resins according to claim 1 characterized by Mooney viscosities, as determined by ASTM D-1646 ranging from about 50 to about 70; Olson Flow times as determined by ASTM D-569 at 120° C. ranging from about 0.5 to about 8.0 seconds and softening points ranging from about 40° to about 60° C.

3. A two step polymerization process for preparing butadiene/styrene copolymer reinforcing resins, said resins being characterized by Mooney viscosities as determined by ASTM D-1646 ranging from about 50 to about 70; Olson Flow times as determined by ASTM D-569 at 120° C. ranging from about 0.5 to about 8.0 seconds and softening points ranging from about 40° to about 60° C., comprising the steps of (A) polymerizing, under aqueous emulsion polymerization conditions, a first monomer mixture consisting of from 5 to 15 parts by weight of butadiene monomer and from 95 to 85 parts by weight of styrene monomer, all parts based on the total weight of the combined monomers polymerized in step (A) to obtain a first butadiene/styrene copolymer latex and (B) adding to and polymerizing in said first butadiene/styrene copolymer latex a second monomeric mixture consisting of from 20 to 35 parts by weight of butadiene monomer and from 80 to 65 parts by weight of styrene monomer, all parts based on the total weight of the combined monomers polymerized in step (B) wherein the ratio of the total weight of the combined monomers polymerized in step (A) to the total weight of the combined monomers polymerized in step (B) ranges from 75/25 to 25/75 and wherein the monomeric mixture polymerized in step (A) ranges from 5 to 32 percent by weight higher in styrene content than the monomeric mixture added and polymerized in step (B).

* * * * *